United States Patent [19]

Bonicioli et al.

[11] Patent Number: 4,932,024
[45] Date of Patent: Jun. 5, 1990

[54] SYSTEM FOR AUTOMATIC CONTROL OF DEVICES, APPARATA AND PERIPHERAL UNITS FOR SIGNAL SWITCHING AND PROCESSING

[75] Inventors: Paolo Bonicioli; Gianbattista Carminati; Giorgio Buonfigliuoli, all of Milan, Italy

[73] Assignee: Etefin S.P.A., Vimodrone Mi, Italy

[21] Appl. No.: 156,853

[22] Filed: Feb. 17, 1988

[30] Foreign Application Priority Data

Feb. 27, 1987 [IT] Italy .................. 19528 A/87

[51] Int. Cl.$^5$ .............................................. H04J 3/02
[52] U.S. Cl. ................................... 370/85.9; 370/85.12
[58] Field of Search .................. 370/8, 67, 85, 86, 89, 370/88, 11.1, 58.1, 58.2, 85.9, 85.11, 85.5, 85.12, 85.7; 340/825.5

[56] References Cited

U.S. PATENT DOCUMENTS 3,924,077 12/1975 Blakeslee ............................ 370/85.7
4,140,877 2/1979 Joslow ................................. 370/85.9
4,530,093 7/1985 Akram et al. ......................... 370/85
4,535,448 8/1985 Baxter et al. ......................... 370/85
4,586,175 4/1986 Bedard et al. ........................ 320/85

FOREIGN PATENT DOCUMENTS 0160443 4/1985 European Pat. Off. .
3333379 9/1983 Fed. Rep. of Germany .
8505241 11/1985 PCT Int'l Appl. .
2113953 11/1982 United Kingdom .
2131654 12/1982 United Kingdom .

Primary Examiner—Joseph A. Orsino
Assistant Examiner—Frank M. Scutch, III
Attorney, Agent, or Firm—Guido Modiano; Albert Josif

[57] ABSTRACT

A system for automatic control of devices, apparata and peripheral units for signal switching and processing, comprising a single central control unit for controlling a plurality of terminals and at least one internal digital line interposed between the central control unit and the terminals and defining a time sharing transmissive channel, divided into a plurality of time slots, with each terminal being fixedly associated to at least one preset time intervals.

33 Claims, 9 Drawing Sheets

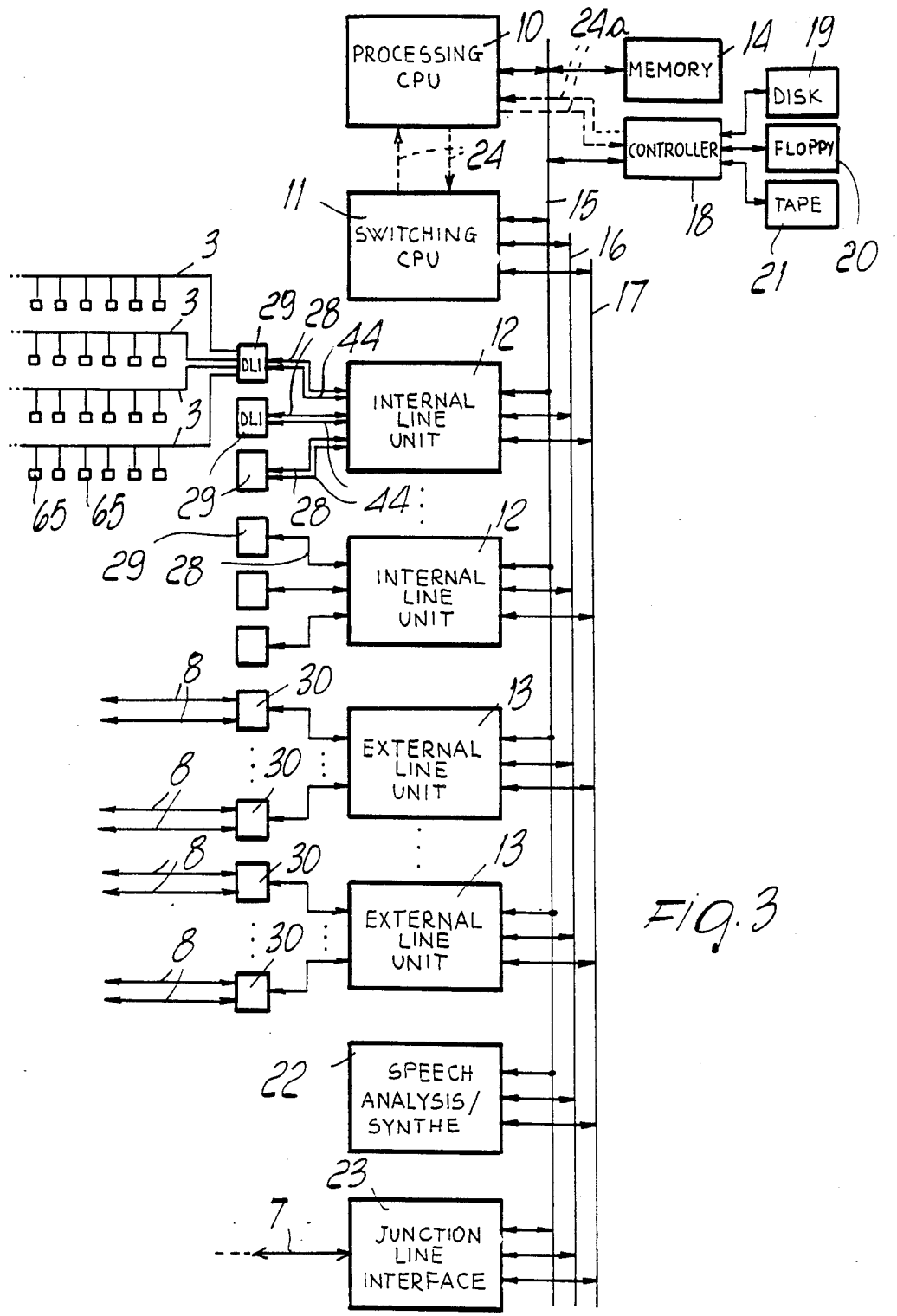

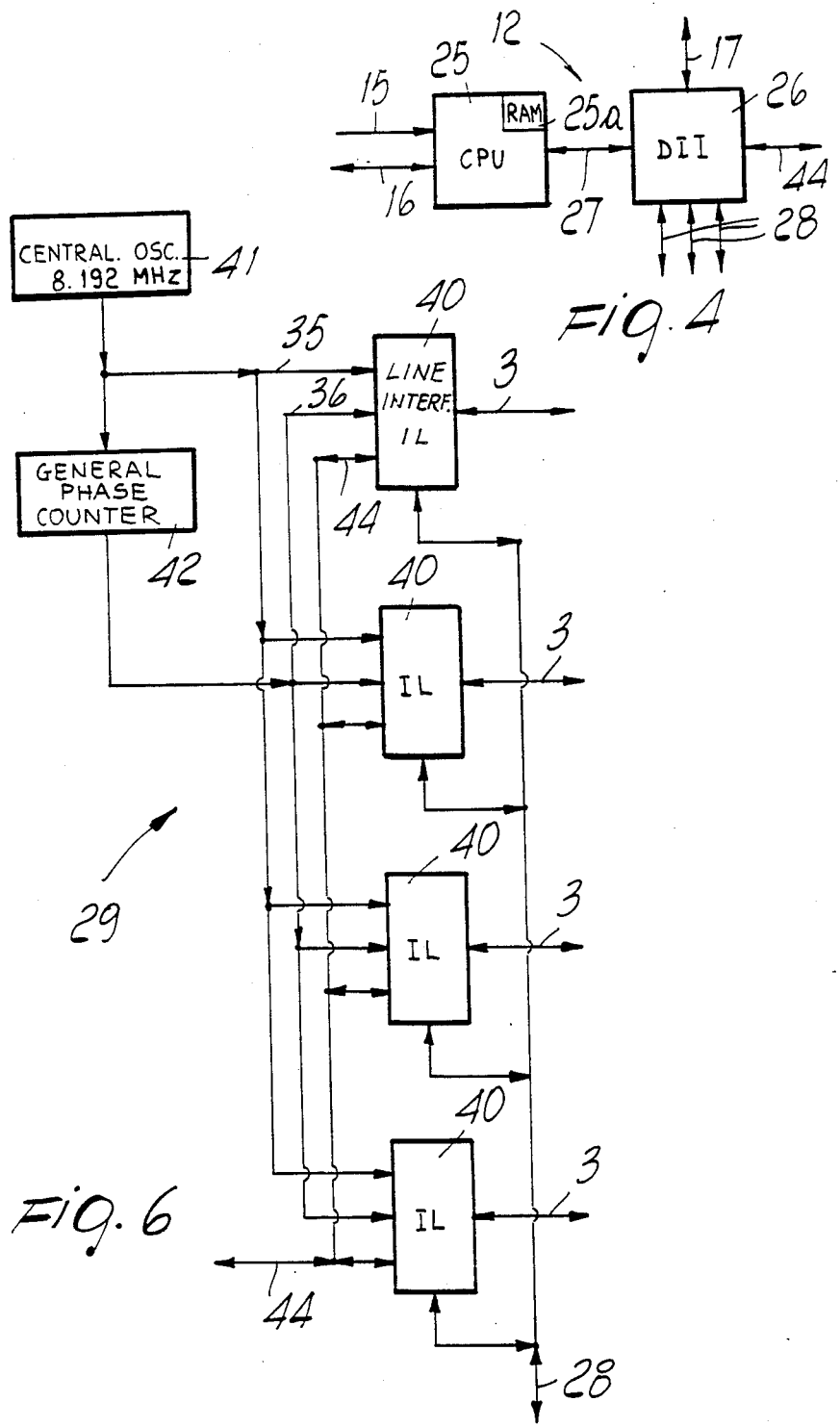

SYSTEM FOR AUTOMATIC CONTROL OF DEVICES, APPARATA AND PERIPHERAL UNITS FOR SIGNAL SWITCHING AND PROCESSING

BACKGROUND OF THE INVENTION

The present invention relates to a system for automatic control of devices, apparata and peripheral units for signal switching and processing, in particular for voice and/or data and/or images.

As is known, the need is currently increasingly felt to automate and mutually connect, by means of appropriate networks, apparata, devices and/or peripheral units used mainly, but not exclusively, in the office, so as to allow them to be more efficiently controlled and to allow a rapid exchange of the required information, simultaneously reducing the times required for the execution of the tasks to be performed by these apparata, as well as the manual interventions by the operators.

In particular, according to the current trends towards office automation, modern exchange systems are becoming increasingly widespread, integrating, besides the switching functions peculiar thereto, also further more advanced functions, for example for preprocessing phonic or speech data and storing particular data. As is known, furthermore, processing systems for controlling the office and the execution of various automated functions, such as for example automatic word processing or deadline control, may be present in the office itself. Finally, units for the control of apparata or devices installed locally or controlled in a remote manner, such as for example alarm detection units, actuators of various types (lighting, gate opening, conditioning, fire prevention, etc.) may be present.

To improve the management and allow an efficient and more extensive control of such different systems, suitable connection networks which allow the exchange of commands, information and data are therefore required. This, as is apparent, entails a hardly negligible burden for the interconnections, besides the fact that generally a simple interconnection can entail a scarcely efficient exploitation of the available apparata due to the present redundancies. Furthermore, in the case of apparata which are not already preset for connection or are not per se intrinsically capable of dialoging with the other apparata, a complicated adaptation thereof, which can be unjustified in some cases, can often be necessary.

To obviate this situation, a known solution provides the connection of telephone sets and peripherals to a processing unit in turn connected to a private telephone exchange (PABX) communicating with the outer environment. The intermediate processor handles the communication requests arriving from the exchange or from the connected sets, directly connecting the exchange with the telephone sets, in the case of phonic data transmission, and handling directly only the transmission of informatic data.

However, even this solution is not free from disadvantages, partly because it does not allow the complete control of the operations and of the processings which may be required, and partly because an efficient use of the apparata which allows the elimination of the redundancies and the attainment of high flexibility is still not obtained.

SUMMARY OF THE INVENTION

Given this situation, the aim of the present invention is to eliminate the disadvantages of the prior art, and to provide a system for automatic control of devices, apparata and peripheral units for signal switching and processing, in particular for phonic signals and/or informatic data and/or images, capable of centralizing the management, control and communication activity of an entire company organization, fully employing the potentialities of the individual parts, so as to reduce redundancies and improve the use of the components and the overall performance.

Within this aim, a particular object of the present invention is to provide a system capable of improving the capability of processing signals and data arriving from, and supplied to, the individual apparata and devices connectable to said system.

In particular, an object of the present invention is to provide a system which simultaneously controls high telephonic and data switching traffic volumes, with high processing and storage speed of data coming from outside and from inside the system and controls all the automatic devices installed.

Another object of the present invention is to provide a system which, by virtue of the better employment of the devices and of the optimization of the available resources, has considerably reduced manufacturing and installation costs with respect to known systems.

Not least object of the present invention is to provide a system having a high flexibility and adaptability for the connection and the control of apparata and devices of various types, possibly with the aid of appropriate interfaces so as to achieve a simple connection and an excellent compatibility with the terminal devices.

This aim, the objects mentioned and others which will become apparent hereinafter, are achieved by the system for automatic control of devices, apparata and peripheral units for signal switching and processing, in particular for phonic signals and/or data and/or images, according to the invention, as described in the accompanying claims.

BRIEF DESCRIPTION OF THE DRAWINGS

The characteristics and advantages of the invention will become apparent from the following description of a preferred but not exclusive embodiment, illustrated only by way of non-limitative example in the accompanying drawings, wherein:

FIG. 3 is a simplified block diagram of the internal structure of the system according to the invention, in a possible configuration thereof;

FIG. 4 is a simplified block diagram of an internal line unit constituting one of the blocks of FIG. 3;

FIG. 6 is a simplified block diagram of the internal line drive unit (DLI);

DESCRIPTION OF THE PREFERRED EMBODIMENTS

Figure 1:
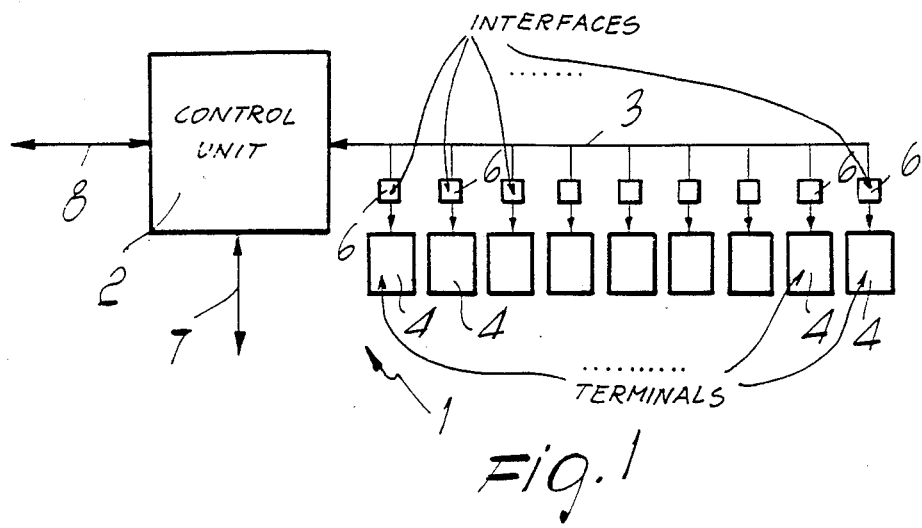
FIG. 1 is a simplified block diagram of the system according to the invention.

Reference should be made initially to FIG. 1, illustrating the general concept of the present invention in its minimum configuration. As can be seen, the system according to the invention, generally indicated in the figure by the reference numeral 1, comprises a central command and control unit 2 capable of handling at least one digital two-wire line 3 to which a plurality of terminals 4 leads; in particular the generic terminals 4 are connected to the line 3 with the interposition of suitable interfaces 6 capable of dialoging with the central unit 2 according to an adapted procedure and possibly of regenerating the line in case of excessive distance of said terminals from the central unit 2. In detail, as will be explained more particularly hereinafter, the terminals 4 on the same line 3 (a maximum of eight, in the case of telephonic terminals, or more in the case of slow terminals, as will also be described hereinafter) share the same line according to a time sharing logic, each being rigidly associated with a predetermined time slot of the channel on which the controls, the signalings and the phonic signal are sent, according to appropriate procedures, as coded with the PCM technique.

Moreover, in FIG. 1, the central unit 2 is connected to two external lines, and precisely the line 8 for connection to external lines or networks, such as local telephone exchanges, modem lines, telex lines, teletext lines or information networks, and the line 7 representing a digital junction line between different systems according to the invention and constituted for example by a pair of coaxial cables capable of carrying data at a rate of 8 Mbit/sec.

Accordingly, the system according to the invention, in its basic configuration, comprises a single central control unit capable of handling the different apparata, devices and intelligent terminals in general, whether telephonic, numeric or actuators of a different type, as indicated above, thus eliminating the redundancies present and allowing to obtain considerable savings, besides a more efficient operation by virtue of the simplification of the connections between the different apparata and terminals.

Figure 2:
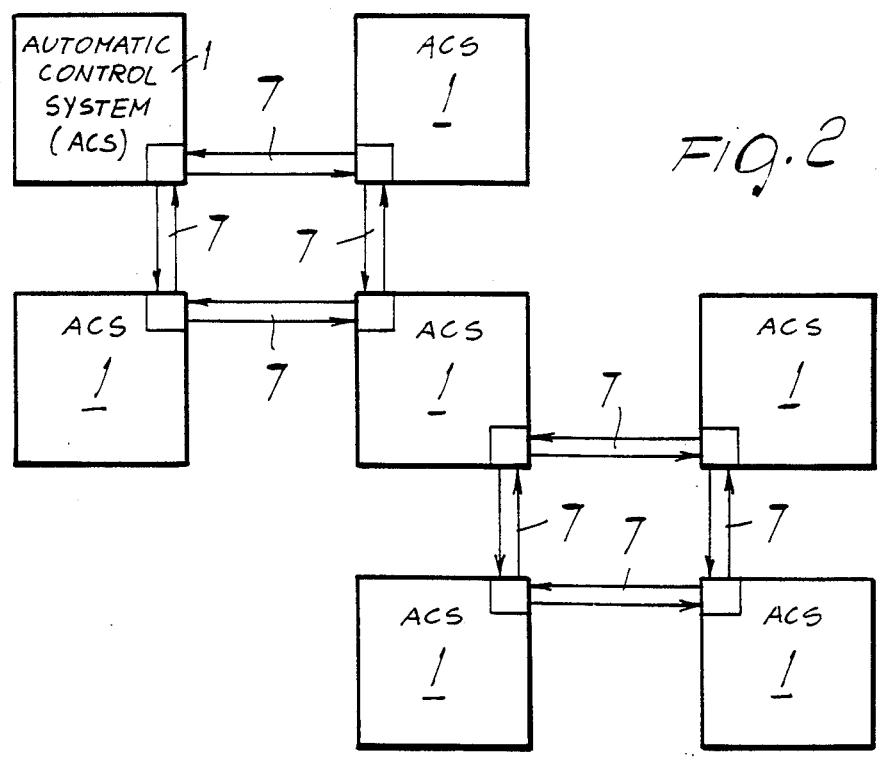
FIG. 2 is a diagram of a possible connection between various systems according to the invention.

Naturally the system according to the invention, as will become apparent hereinafter, has high modularity and flexibility so as to allow its expansion and adaptation to quantitatively different requirements. In particular the basic configuration shown in FIG. 1 can have and in general will have further digital lines 3 and furthermore may be connected to other similar systems by means of one or more lines 7, so as to form a network of systems, as illustrated by way of example in FIG. 2, showing such a network of seven systems 1. As can be seen in the illustrated example, the network comprises two loops, with one of the systems common to both loops, but in general the connection can be any according to the requirements.

Hereinafter the internal structure of the central unit 2 is described with reference to FIG. 3, illustrating the complete configuration, which however can be modified and adapted to the existing requirements both in terms of the presence of the various units which compose it and of their number.

In detail, the system according to the invention, in its essential lines, comprises a central processing unit 10, a central switching unit 11, one or more internal line units 12, one or more external line units 13, memory units 14 and three communication buses including the multibus 15, the minibus 16 and the PCM bus 17. According to the requirements, a mass storage controller 18 with related harddisk memories 19, floppy disk memories 20 and tape memories 21, a speech synthesis/analysis unit 22 and one or more junction line interfaces 23 can be furthermore provided. In particular, each of the above-mentioned elements or units has been designed as a module which will be mounted on suitable cards according to the desired configuration, thus allowing in a simple and rapid manner the obtainment of different structures depending on the overall dimensions of the system and on the desired functions. Furthermore, as will be apparent in greater detail hereinafter, the central switching unit 11, the controller 18, the junction line interface 23, the speech synthesis unit 22, the internal line units 12 and external line units 13 are intelligent units, equipped with a control processor of their own. Said control processors will not be described in detail, since they are of a structurally conventional type, comprising a microprocessor, for example of the 16-bit or 32-bit type, a pair of RAM memories for programs and data to be temporarily stored, one or more interfaces for connection to the PCM channels or to the connected lines, as well as one or more buses for data, addresses and controls.

According to the invention, therefore, the central processing unit 10 comprises a central 32-bit processor, with virtual-memory multiuser operating system, for centralized control of the entire system and of the management data processing by means of applicative packages. The unit 10 is connected to the other units of the system via the multibus 15 and sends controls and receives information on said bus. Furthermore, by means of the lines 24, 24a drawn in broken lines in the figure, the unit 10 is connected to the central switching unit 11 and to the controller 18 for the transmission of the interrupt signals.

The central switching unit 11 instead has the task of sorting and routing the communication data and of coordinating control of the telephone services. For this purpose, the unit 11 (see FIG. 11) comprises a central 16-bit processor, CPU 120 (including in its interior suitable interfaces for connection to the multibus 15, the minibus 16 and the interrupt lines 24 as well as a RAM memory of its own, indicated schematically in the figure at 134) and further circuits, illustrated schematically in the figure by the PCM line switching block 130, for switching the data and information arriving from the internal and external line units through a channel of the PCM bus 17 on another channel of the same bus for connection to the receiving unit, allowing both the connection of a plurality of internal telephonic terminals to one another and to the external lines, and the obtainment of the conference service. Said switching block 130 can be implemented by means of a time switching matrix of a commercially available type, for example the MO88 component manufactured by SGS THOMSON MICROELECTRONICS SPA, for exchanging the time slots of the travelling signals within the PCM channels 17. Moreover the central unit 11, by means of the digital generator 131 (illustrated in greater detail with reference to FIG. 12), generates all the tones which identify the various call phases, including the multifrequency tones used for multifrequency local lines, and, by means of the digital interface 132 (illustrated in greater detail with reference to FIGS. 13 and 14 and interposed between the PCM line 17 and the processor 120), allows the exchange of data between the central processing unit 10 and the peripheral terminals. For this purpose the RAM memory 134 is used, which temporarily stores the data and addresses supplied by the terminal by means of the interface 132. For the transfer of the data to the central processing unit 10, the unit 11 transfers the data to the memory unit 14 by means of the multibus 15 sending an appropriate signal on the line 24 towards the unit 10 which will fetch them from said memory unit 14, again by means of the multibus 15, according to its internal cycles. The transmission of data from the unit 10 towards the unit 11 occurs similarly, but in a reverse manner, and these data are transmitted directly to the awaiting terminal via the interface 132.

The controller 18 allows the transfer of data between the mass memories and the memory unit 14 (system memory) using the multibus 15. In fact the controller 18 is an intelligent unit having its own 16-bit central processor and internal intermediate RAM memory as well as particular circuitry for handling the various memories 19–21 connected thereto.

The memory unit 14, which can comprise both RAM and EPROM memories, is used to contain both data and programs for system control as well as permanent data related to services such as accounting, abbreviated dialling, service classes, flexible numbering, and so on.

As indicated above, the memory unit 14 dialogs with the other units of the system on the multibus 15 operating at 32 or 16 bits and having the function of allowing rapid exchange of data indeed between the central processing unit 10, the central switching unit 11, the junction line interface 23, the memory unit 14 and the controller 18, and to allow sending of the initialization data from the central processing unit to the units 11, 12, 13, 22, 23 after system power-on.

The 8-bit minibus 16 is used instead for the exchange of operative information between the central switching unit and the various units 12, 13, 22 and 23. For this purpose, all the units connected to the minibus are provided with an interface through which each can ask for access to the minibus. Dialog occurs according to a protocol in which the control signals are used to access the bus and perform the transfer of the data into a service memory present in the switching unit 11.

The PCM bus 17, constituted by 16 central PCM channels, each comprising a bidirectional two-wire line for transmission and reception, interconnects all the internal line units 12, the external line units 13, the junction line interface 23 and the speech synthesis/analysis units 22 with the central switching unit 11 for the transfer of the phonic and numeric data related to said units. The data related to 32 terminals (telephone sets, peripherals or other devices controlled by the system) are simultaneously transmitted on each central PCM channel at a rate of 2048 Kbit/sec, and therefore in a frame period of 125 $\mu$sec 32 time slots are transmitted, each containing 8 bits of information related to a single terminal. In practice, for the connection between two terminals connected to different internal line units, or between a terminal and an external line or a junction line, the calling unit 12, 13 or 23 sends a signal on the minibus 16 to the central switching unit 11 and the data to be transmitted on a channel of the PCM bus 17 and the central switching unit routes the data on another PCM channel towards the receiving unit. Furthermore, as to the exchange of digital data between the central processing unit 10 and the units 12, 13, 22, 23, the frames can be grouped in groups of eight, to form superframes containing 256 frame slots, as will be illustrated hereinafter with reference to FIG. 5e and to the description of the digital interface 132 for PCM data.

The speech synthesis/analysis unit 22, provided with its own local 16-bit control processor, is responsible of: sending recorded speech signals, possibly recording calls (telephone communications) from outside towards an internal terminal (in the absence of the called person - answering-machine functions -), routing communication requests towards another internal terminal, as well as sending phonic messages to assist blind staff at particular terminals.

The junction line interface 23, equipped with a 16-bit control processor, implements the connection of a plurality of systems according to the present invention (for example as illustrated in FIG. 2) allowing the users of each system the access to, and use of, resources belonging to a different system. The junction between two systems is obtained with two one-way coaxial cables; on each junction cable, carrying a channel equivalent to 128 phonic channels, the flow of data occurs at a rate of 8 Mbit/sec.

Each external line unit 13 (having a structure similar to the internal line unit 12 which will be illustrated in detail with reference to FIG. 4) has the function of driving a plurality of external line interfaces 30 (typically twenty). In detail, each external line unit (not shown in its internal structure) comprises a control processor (identical to the processor 25 of the internal line unit 12 which will be described hereinafter) and an external interface drive unit. The control processor, besides handling the signaling bits, typically related to the incoming and outgoing local call operations, deals with all the telephonic services pertinent to the external lines. In turn the external interface drive unit allows the exchange of phonic or numeric signals between the central switching unit 11 and the external line units by connecting to two of the PCM channels belonging to the line 17. Finally, the external line interfaces 30 have the function of converting the analog or digital signals, available on the lines 8, in digital signals processable by the system, both as phonic or numeric data to be sent to the drive unit comprised in the external line unit 13 and as signals for controlling the hardware connection protocols to be sent to the control processor of the same external line unit 13. Said external line interfaces, connectable to one or two telephone loops (each defining a line 8), have a different circuital structure, according to the type of line to which they connect and include A/D and D/A converters, for example of the type known as COMBO.

Each internal line unit 12 (see FIG. 4) comprises a 16-bit peripheral processor, CPU 25, with internal RAM memory 25a, intended to handle the signaling or communication data passing through the related unit 12 from and towards the telephonic and numeric terminals, in order to provide all the internal telephone services and the further functions required by the controlled terminals. The processor 25 also comprises the interfaces required for the connection, already described, to the multibus 15 and the minibus 16. Furthermore, each internal line unit 12 comprises an internal interface drive unit, DII 26, connected to the CPU 25 on the bidirectional line 27. The DII unit 26, substantially constituted by a multiplexer (for example a time switching array of a type similar to the block 130 of the central switching unit 11) and by a centralized logic, has the task of grouping the phonic or numeric data arriving from the central switching unit 11 on one of the five channels of the PCM line 17 to convey them appropriately towards the terminals on three internal PCM channels, 28. Each of these PCM channels 28 connects to a corresponding internal line drive unit, DLI 29, for transmitting 32 time slots of 8 data bits during each frame. The units 29 in turn each comprise four internal line interfaces receiving the PCM channel in parallel and enabled in time sequence to receive only the data intended for them, as will be explained in greater detail hereinafter with reference to FIGS. 7, 8. The reverse exchange of the data from the terminals to the central switching unit 11 occurs in a similar and simultaneous manner. The DII unit 26 furthermore physically performs the exchange of the signaling bits between the CPU 25 and the DLIs 29, acquiring them in groups of eight bits from the CPU 25 on the line 27 and from the DLIs 29 on the line 44 (in appropriate times), respectively in transmission or in reception, to convey them consequently towards the DLIs 29 or the CPU 25.

Before illustrating the internal structure of the DLIs 29, reference should be made to FIGS. 5a–5d related to the structure of the signals transmitted on the central PCM lines 17 as well as incoming and outgoing from the DLIs 29 on the PCM lines 28 and on the internal lines 3.

Figure 5A:
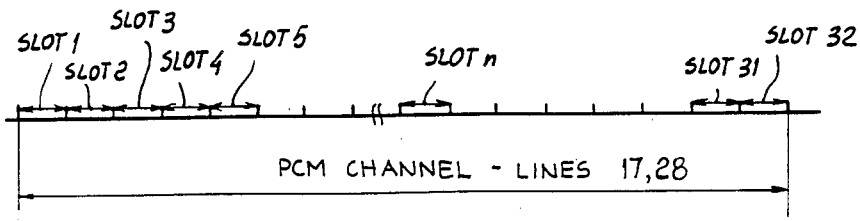
FIGS. 5a–5e illustrate the structure of some of the digital signals used in the system according to the invention.

FIG. 5a illustrates the structure of the signals transmitted on the central PCM channels 17 and the internal ones 28. Each channel 17, 28 has a frequency of 2048 Kbit/sec grouped in frames during 125 μsec and including each 256 bits corresponding to 32 time slots (indicated at SLOT1 ... SLOT32 in the figure) of eight bits. The PCM channel 28 is thus connected (by means of the DLIs 29) to four lines 3 corresponding to 32 phonic channels, that is to say as many as the time slots of the PCM channel 28. In detail, each internal line 3 is rigidly associated to different groups of time slots, each group including eight time slots of the 32 available ones of the PCM channel. Precisely, the first line will be associated to SLOT1, SLOT5, . . . the second line to SLOT2, SLOT6, . . . the third line to SLOT3, SLOT7, . . . etc.

Figure 5B:
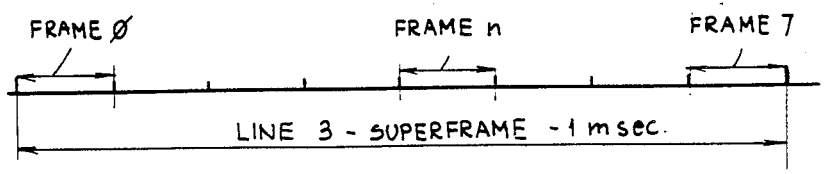
Figure 5C:
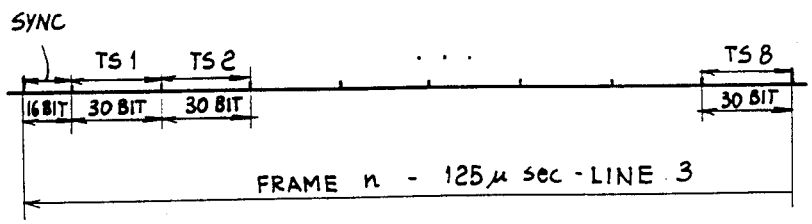
Figure 5D:
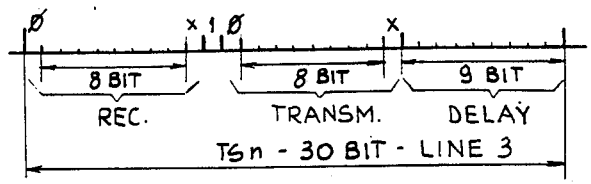
Figure 5E:
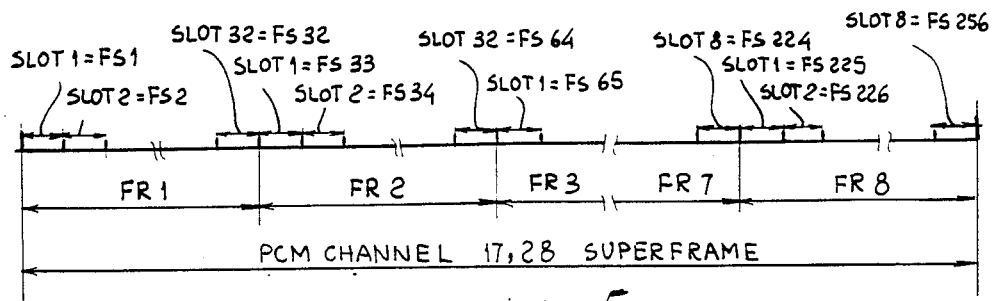

Each DLI 29 thus sends on each line 3 a signal the structure whereof is shown in FIGS. 5b–5d. In detail (FIG. 5b), the signals sent on the line 3 are grouped in superframes, each with 1 msec duration and formed by 8 frames, each of the duration of 125 μsec and comprising 256 bits, divided into 16 initial synchronization bits (SYNC) and eight groups of 30 bits (time slots TS1 . . . TS8) of data and signalings (FIG. 5c). The 16 initial synchronization bits are equal to one another (in a specific configuration, which cannot casually occur during the transmission of the data or of the signalings), except that for the first frame of the superframe (FIG. 5b), so as to always allow the identification of the beginning of each superframe and of each frame by each terminal which must identify the signals to be received and when to transmit. In fact each time slot TS is rigidly associated to one telephonic terminal or to one numeric terminal (or more terminals, in the case of slow ones) which is thus enabled to receive and transmit data and signalings only at the associated time slot and must therefore have a reference to identify it. It should be noted that in the case of slow terminals, some of them can be simultaneously associated with the same time slot (but in different frames, so as to always have univocity in the assignment of the exchanged data and the origin or destination terminal), or vice versa, in the case of fast terminals, a terminal of this type can be associated to more than one time slot.

In turn, each time slot TS (FIG. 5d) comprises a first bit of preset value (e.g. "0"), generated by the DLI 29, followed by eight reception data bits (that is to say sent towards the terminal), then a reception signaling bit (shown as "x" in the drawing). A bit of preset value (e.g. "1") and ten transmission bits follow, sent by the terminal, including a preset bit (e.g. one 0), eight transmission data bits and a transmission signaling bit (shown as x). Each frame furthermore comprises nine further free bits, to allow the exchange of data and signalings even in the case of terminals located at a certain distance from the respective DLI. In fact in this case the terminal receives the ten reception bits delayed with respect to the instant in which they have been issued by the DLI, which latter will therefore receive the data transmitted by the terminal with a further delay, equal to twice the preceding one. Within certain limits of delay, therefore, a communication of the indicated type between each terminal and the associated DLI will still be possible, but the group of ten transmission bits sent by the terminal will be shifted, within the associated time slot TS, by a certain number of bits rightwards with respect to the illustrated nominal position. If instead the delay between the terminal and the associated DLI exceeds the value allowed by the presence of the nine delay bits, a line regenerator will be provided, as described hereinafter.

Since, as indicated, the signalings both towards and from the terminal are sent one bit at a time, sending of a complete signal message will require one superframe (each signal message being constituted by eight bits).

Reference should now be made to FIG. 6, illustrating the block diagram of the DLI 29. As can be seen, each DLI 29 comprises a plurality of line interfaces (IL) 40 (one for each internal line 3) driven by a central oscillator 41 at 8192 KHz on the line 35 and by a general phase counter 42 which, by means of an appropriate signal on the line 36, synchronizes operation of ILS 40 in a suitable manner, so as to allow the interfaces 40 of each line to rigidly connect to different groups of eight time slots (SLOT1 . . . SLOT32) of the 32 available ones of the PCM channel 28. Each line interface 40 is furthermore connected on the line 44 to the DII 26 (FIG. 4) which transfers the signalings to the processor 25 for their processing.

Figure 7:
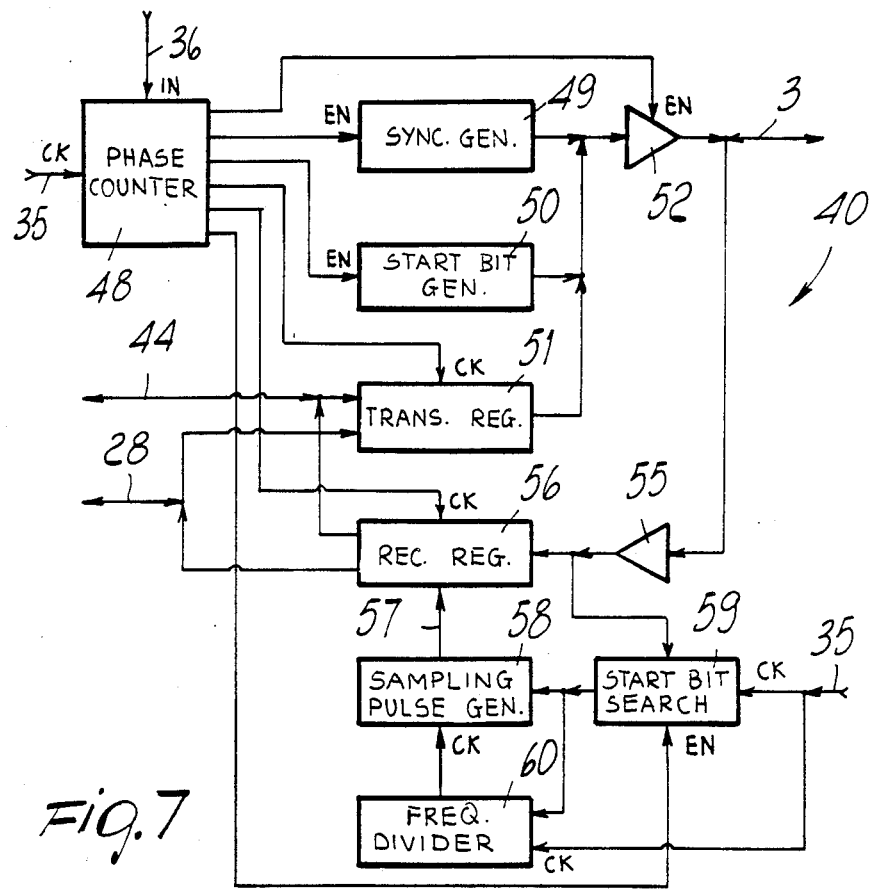
FIG. 7 is a detailed block diagram of a part of the unit of FIG. 6.

The internal diagram of each interface is apparent from the block diagram of FIG. 7. In detail each interface 40 has a transmission section for transmitting data and signals towards the line 3 (and therefore towards the terminals connected thereto) and a reception section for receiving data and signals from line 3 and sending them respectively on the PCM channel 28 and on the line 44. The transmission section, having the purpose of generating, for each internal line 3, the carrier structure of the signal, illustrated in FIGS. 5b–5d, and comprising the frame or superframe synchronization bits, the eight initial bits set to 0 (start bits) of each time slot TS, possibly followed by the eight data bits towards the terminal and by the signaling bit, comprises for this purpose a phase counter 38, connected at the inputs CK and IN to the lines 35 and 36, a synchronization generator 49, enabled by the phase counter 48 on the input EN, a start bit generator 50, also enabled by the phase counter 48, transmission registers 51, synchronized on the inputs CK by the signal supplied by the counter 48 and connected to the PCM line 28 and to the unit DII 26 on the line 44, as well as an output buffer 52. Precisely, the synchronization generator 49 outputs the bits for the normal frame synchronization, replaced, every eight frames, by the superframe synchronization bits. Similarly, and successively to each start bit, the transmission registers 51 are enabled to unload the information contained therein as data bits and signaling bits. These bits are carried to the output buffer 52 which drives the line cable with the necessary power during the transmission, remaining instead power-disconnected in all the other instants by command of the phase counter 48. The phase counter 48 furthermore controls the transmission registers to allow loading of the data bits in the exact instant in which the same are available in the transmission time slot (SLOTn) of each terminal on the PCM channel 28. Instead the signaling bits are supplied directly by the DII unit 26 which updates them at every frame period by command of the processor 25.

The reception section of each line interface 40, having the function of exactly capturing the eight data bits and the signaling bit arriving from the terminals and of transmitting them towards the PCM channel 28 or towards the line 44, comprises an input buffer 55, connected to the line 3, reception registers 56, receiving at the input the bits supplied by the buffer 55 and synchronized by the counter 48 and by appropriate sampling pulses on the line, generated by a sampling pulse generator 58, a start bit search circuit 59 and a frequency divider 60, for enabling the generator 58. In detail, in the reception direction, the input buffer 55 receives from the line 3 a bit at standard logical levels which is sent to the reception registers 56 and to the start bit search circuit 59. The start bit search circuit 59, driven by the central oscillator 41, waits for the first falling edge of the logical state of the line to then synchronize the frequency divider 60 (operating from 8192 to 2048 KHz) which drives the sampling pulse generator 58, also enabled by the start bit search circuit 59. In this manner the sampling pulse generator 58 is capable of supplying in any moment those clock signals which are required by the reception registers 56 to capture the data and the signaling bits sent by the terminals. The phase counter 48 furthermore controls the reception registers 56 to allow the unloading of the data bits towards the PCM channel in the exact instant corresponding to the reception time slot (SLOTn) of each terminal on said PCM channel. The signaling bits are instead sent directly, by means of the DII unit 26, to the processor 25 which processes them at each frame period.

Figure 8:
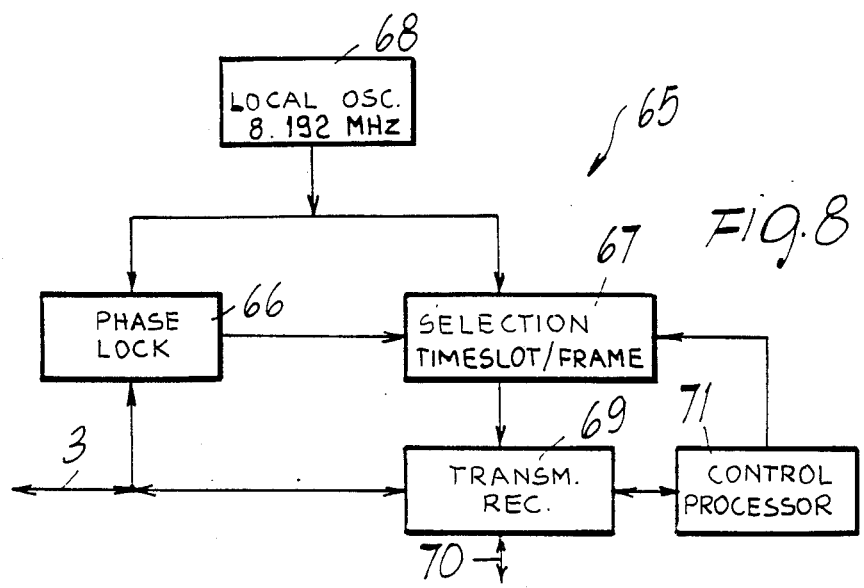
FIG. 8 is a simplified block diagram of the unit for interfacing with the phonic and numeric terminals controlled by the unit according to FIGS. 6 and 7.

FIG. 8 instead illustrates the general block diagram of the terminal interface 65, each arranged between the line 3 and a respective terminal 4 as well as in the line regenerator, as will be explained in greater detail hereinafter. If they are provided exclusively for direct connection to the terminals, said interfaces will be provided in the maximum number of eight for each line, in the case of only telephone-type terminals, and of 64, in the case of exclusively digital-type, slower terminals, however mixed combinations are also possible. The function of said interfaces is to allow the synchronization of the related terminal (or of the line regenerator containing said interface) on the frames arriving from the associated IL40 along line 3 to allow the selection of the instants exactly corresponding to the programmed time slot (TSn) and frames. For this purpose each interface 65 comprises a phase lock circuit 66 which drives a time slot/frame selection circuit 67, both synchronized by a local oscillator 68 at 8192 KHz. The interface 65 furthermore comprises a transmission and reception section 69 connected to the line 3 and to the related terminal (or to the other parts of the regenerator) on the line 70 and driven by the selection circuit 67 and by the control processor 71 for data and signalings exchange with the terminal and the control processor 71 which performs local data processing and control of the operative functions of the terminal.

Figure 9:
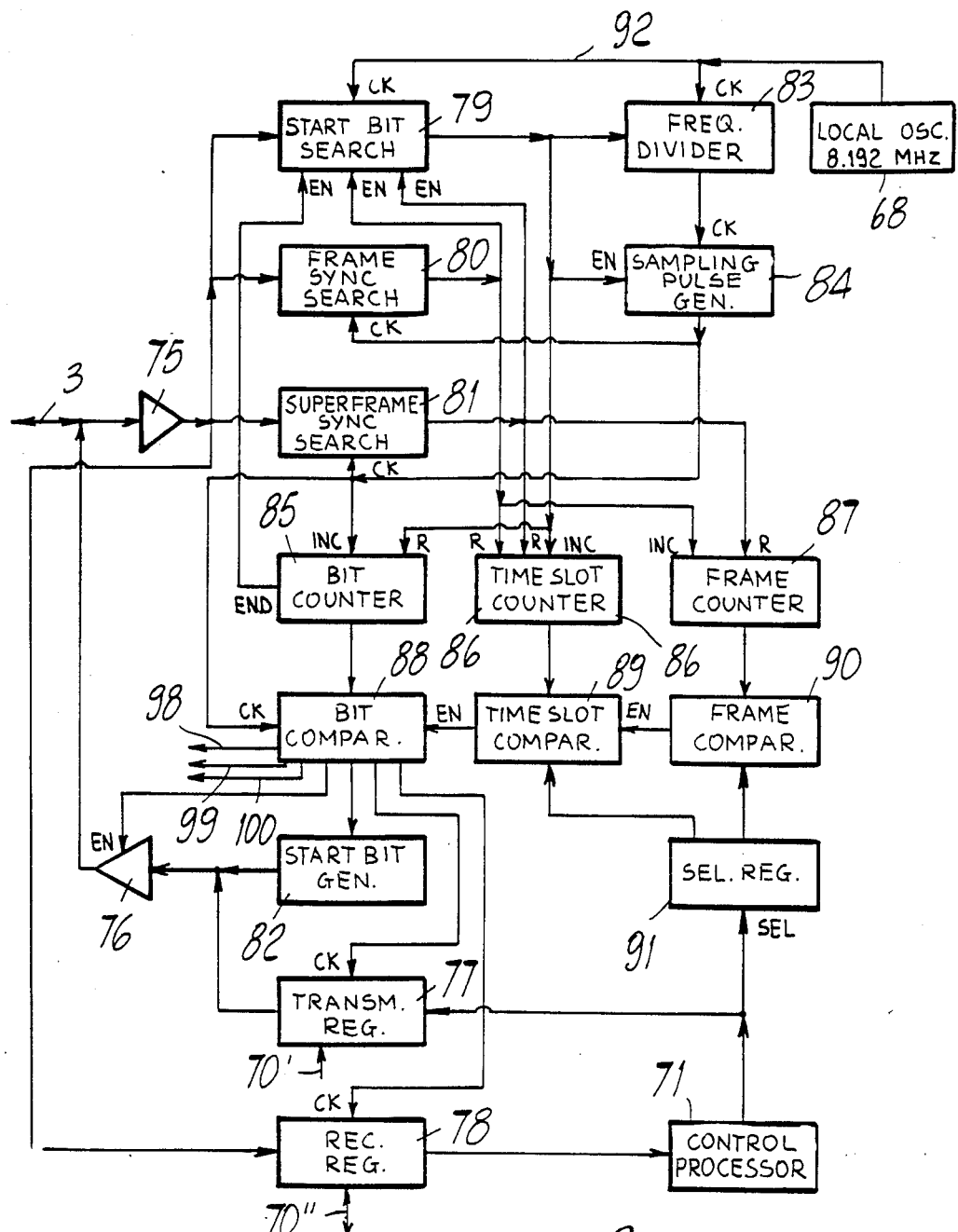
FIG. 9 is a detailed block diagram of the unit according to FIG. 8.

The detailed block diagram of the terminal interface 65 is shown in FIG. 9. As can be seen, the transmission and reception section 69 comprises a pair of buffers 75 and 76, respectively for input and for output, and a pair of registers 77 and 78 respectively for transmission (connected to the line 70') and for reception (connected to the line 70"), as well as a start bit generator 82. The phase lock circuit comprises a start bit search circuit 79 (synchronized by the local oscillator 68 by means of the line 92), a frame synchronization search circuit 80 and a superframe synchronization search circuit 81, both connected to the input buffer 75. The time slot/frame selection circuit 67 comprises a frequency divider 83, controlled by the local oscillator 68 on the input CK and by the start bit search circuit 79 on the input EN, a sampling pulse generator 84, controlled by the divider 83 on the input CK and enabled by the start bit search circuit 79, three counters 85–87, respectively for bits, time slots and frames, three comparators 88–90, and selection registers 91.

The terminal interface 65 operates as follows. The input buffer 75 which, as in the DLIs, reconstructs from the line 3 a logical signal at standard levels, drives the three start bit search 79, frame synchronization search 80 and superframe synchronization search 81 circuits. The periodic operating cycle starts when the superframe synchronization search circuit 81, always enabled, detects from the line the presence of the superframe synchronization bits. Then said circuit 81 resets (on the respective inputs R) the frame counter 87 and the time slot counter 86 as well as enables the start bit search circuit 79 (input EN). This circuit, operating in a manner fully similar to the corresponding one in the DLI, detects the start bit of TS1, generated by the circuit 50, and consequently synchronizes the frequency divider 83 which, driven by the local oscillator 68, by means of the sampling pulse generator 84, allows the synchronization of all the circuits of the interface. The detection of the start bit also determines a reset of the bit counter 85 on its input R and an increment of the time slot counter 86 (through its input INC) which thus assumes the value 1 to indicate that the circuit is locked or associated to TS1.

Then, as the bits transmitted on the line 3 gradually arrive, and upon control of the synchronization signals sent by the sampling pulse generator 84, the bit counter 85 is incremented until it reaches the final configuration equal to 30 bits, at which the increments of the counter 85 are blocked and its output END is fed to re-enable the start bit search circuit 79. Then, with the detection of the successive start bit of the TS2 arriving from the line 3, the described cycle is repeated, so that the time slot counter will assume the value 2, and so on until the end of the frame when the time slot counter 86 will have reached 8.

Subsequently, the frame synchronization search circuit 80 will recognize the bits related to the frame synchronization and will send at the output a suitable signal which will determine the increment of the frame counter 90 (which before was at 0 and thus is set to 1), the reset of the time slot counter 86 and the re-enabling of the start bit search circuit 79. The described behavior repeats for another seven frames, in each whereof the frame counter 90 will assume the successive values up to 7. At the end of the described sequence the configuration of the superframe synchronization bits will again be recognized, so that the interface will return to the initial situation from which the described periodic operating cycle will again be repeated, thereby each interface is capable of knowing in every instant the frame and the time slot present on the line.

In the meantime the frame comparator and the time slot comparator 90, 89 continue to receive at the input the states of the corresponding counters 87, 86 as well as the content of the selection registers 91, presettable at the SEL input by of the control processor 71 for univocally identificating the time slots and of the frames to which the terminal connected to the interface at issue is associated. Therefore the comparators are capable of outputting a suitable signal when the state of the counters is comprised within the intervals of acceptance specified by the registers 91. In particular, in the case of connection to a phonic terminal, the registers 91 will specify a frame acceptance interval of 0 to 7 and a time slot acceptance interval constituted by a single time slot (for example from 2 to 2); in this manner the phonic terminal will be associated with the time slots 2 of all the frames, receiving and transmitting as required a group of eight data bits and a signaling bit every 125 $_{82}$usec. of frame. On the contrary, for a numeric terminal, the selection register may specify a frame acceptance interval constituted by a single frame (for example from 3 to 3) and a time slot acceptance frame again constituted by one time slot (for example from 1 to 1), in this manner the numeric terminal will connect to the time slot 1 of only the frames 3, transmitting a group of eight data and a signaling bit every eight frames, that is to say every 1000 $_{82}$usec. Finally, if the interface constitutes a part of the line regenerator (as will be explained hereinafter) the selection register may specify an acceptance interval constituted by different time slots (for example 5 and 6) and all the frames 0-7 (if two phonic terminals are provided downstream to the regenerator). Naturally combinations of any kind are possible compatibly with the configuration of the terminals, so long as within the maximum capacity of the internal line.

The signal generated by the group of comparators 89, 90 finally enables the bit comparator 88 which, within the 30 bits corresponding to the locked time slot, sequentially sends a suitable series of signals for enabling the reception registers 78, the start bit generator 82 (which thus sends on the line 3 the initial 0 bit of the transmission block - see FIG. 5d -) and the transmission registers 77. In this manner the eight data bits and the signaling bit coming from the input buffer 75 are loaded in the reception registers and, immediately after a pause time one bit long (corresponding to the bit preset to 1 between the reception sequence and the transmission one), the start bit, the data bits and the signaling bits to be sent to the DLI are transmitted. The output buffer 76, which sends these signals on the line with suitable power, is naturally enabled by the bit comparator 88 only for the minimum time required to not interfere with the successive signals arriving from the line 3. Furthermore the reception and transmission registers are continuously handled in real time by the control processor 71 which at each frame updates and processes the data and signal bits in transmission and reception within the time slots associated with the interface. Furthermore, the bit comparator 88 is capable of generating suitable signals, supplied on the lines 98-100 for enabling the line regenerator, if provided as will be explained in greater detail with reference to FIG. 10.

Figure 10:
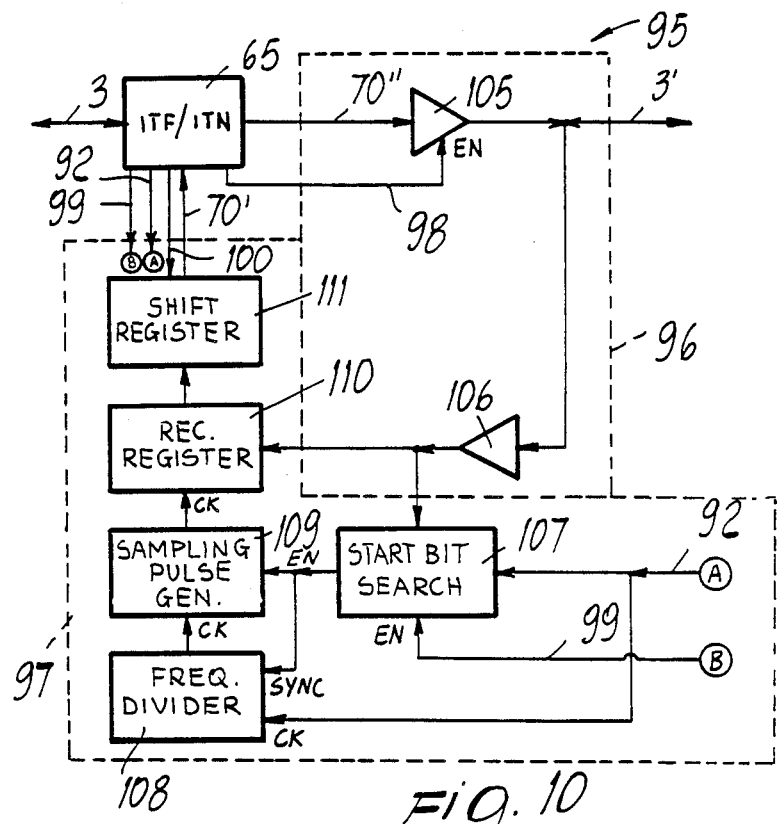
FIG. 10 is a detailed block diagram of a line regenerator.

Reference should now be made to FIG. 10, illustrating the detailed block diagram of a line regenerator, having the function of allowing the connection of the terminals to the internal line 3 even when the same are at distances greater that the maximum one reachable with a normal connection (approximately 250 m). The reasons which determine this limit are of two types: the degradation of the signal levels and form caused by parasite resistances and capacities of the transmission cable and the delay of the signals arriving from the terminal interfaces 65 to the internal line driving units, DLI 29, delay which is caused by the not negligible propagation time introduced by the transmission cable.

In particular the line regenerator, generally indicated at 95, comprises in its interior a terminal interface 65 structured as described with reference to FIGS. 8 and 9 and having the specific task of synchronizing itself on the frames and time slots arriving from the DLIs 29 on the line 3, an input/output section 96, having the function of driving the successive section (identified at 3') of the line cable with renewed power, and a frame delay circuit 97 having the function of supplying, to the transmission registers 77 of the terminal interface 65, the data and signalings received, through means of the section 96, from the line 3' regenerated in all the corresponding time slots of the preceding frame.

With this structure the buffers 75 and 76 of the interface 65 and the input/output section 96 obviate the degradations of the line signal in both directions of transmission, while the delay circuit 97 eliminates the problem of the propagation delays by delaying to the successive frame the signal arriving from the remotest terminals and propagating towards the DLIs 29. Naturally the presence of the terminal interface 65 allows the regenerator to be programmed to perform the regeneration of any set of adjacent time slots, and therefore of even only one, according to network requirements. It is furthermore possible to have a network formed of a plurality of line regenerators in cascade, in which each regenerator regenerates and delays the time slots related to all the terminals connected downstream with respect to the regenerator itself, so that the signal supplied to or arriving from terminals placed downstream with respect to two or more regenerators will be regenerated and respectively delayed two or more times.

In detail, the input/output section 96 comprises an output buffer 105, the input whereof is connected to the line 70" coming from the reception registers 78 of the terminal interface 65, the output whereof is connected to the regenerated line 3 and which is enabled by the bit comparator 88 through of the line 99, and an input buffer 106, connected at the input to the regenerated line 3 and at the output to the delay circuit 97. In turn the latter comprises a start bit search circuit 107, synchronized by the local oscillator 68 through the line 92 and enabled by the bit comparator 88 through the line 99, a frequency divider 108 connected to the local oscillator 68 on the line 92 and synchronized by the start bit search circuit 107, a sampling pulse generator 109, synchronized by the divider 108 and enabled by the circuit 107, a reception register 110, synchronized by the generator 109 and connected to the output of the input buffer 106, and finally a shift register 111, connected to the reception register 110 and controlled by the bit comparator 88 on the line 100.

The regenerator 95 operates as follows. The data and the signalings received by the line 3 are sent, in the manner described with reference to FIG. 9, on the line 70" to the buffer 105 which, conveniently enabled by the signal on the line 98, drives the line 3' with renewed power. Then the comparator 88 blocks the output buffer 105 whenever the regenerated line 3' must not be occupied by any signal arriving from the DLIs 29, but must be free to receive the signal transmitted by the terminals or by the regenerators connected downstream. Said signal, suitably detected by the input buffer 106, is transferred to the delay circuit 97. Said circuit, which is formed by blocks having structure and operation similar to those of the corresponding blocks used in the line interfaces 40, upon enabled by the bit comparator 88 on the line 92, receive the eight data bits and the signaling bit transmitted by the terminals in each of the eight time slots of the regenerated line 3'.

The total of the nine bits is thus temporarily stored in the reception register 110 and then transferred in the nine-bit, seven-stage shift register 111 which at each time slot is caused to shift by one location by a signal taken by the bit comparator 88 and supplied on the line 100. In this manner after eight time slots the data and signaling bits loaded in the reception register will be sent, on the line 70', to the transmission registers 77 of the terminal interface which then again sends them towards the line 3 and thus towards the associated DLI, thus delayed by one frame.

Figure 12:
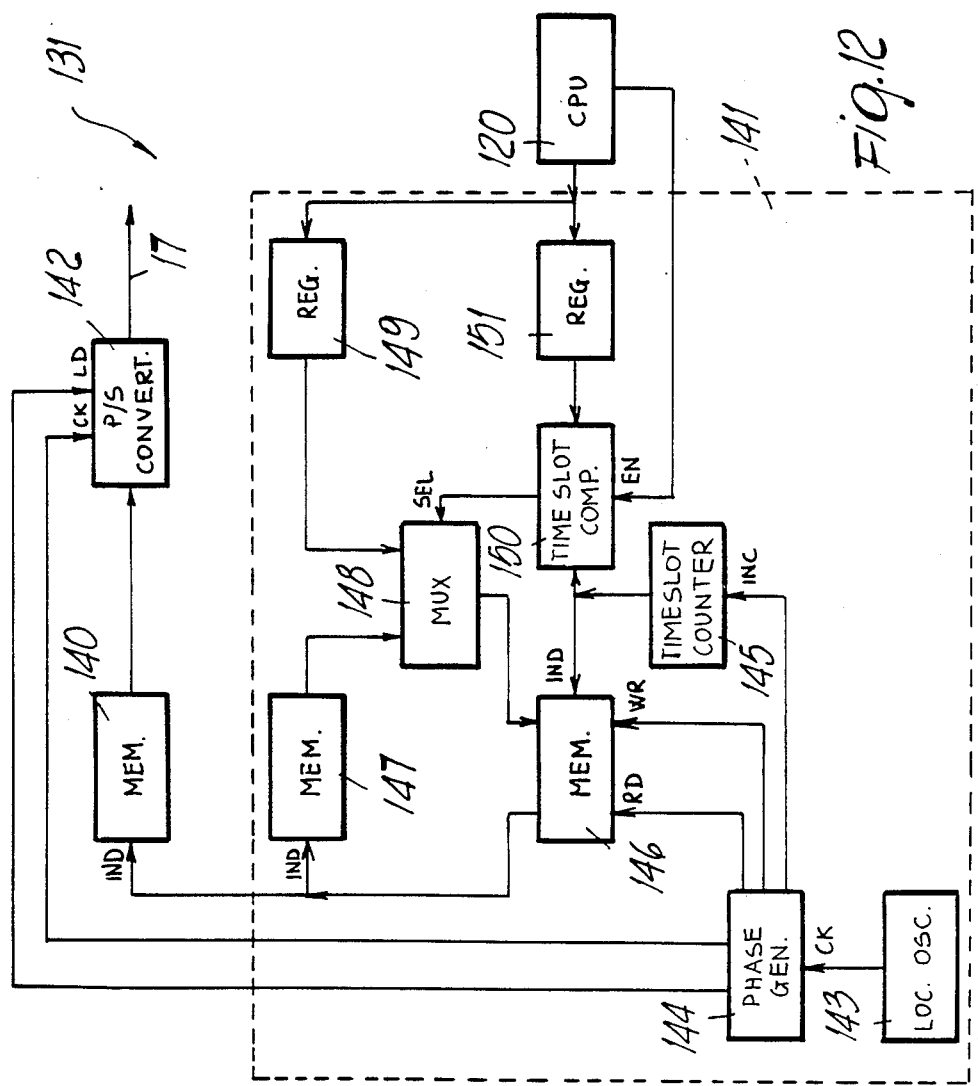
FIG. 12 is a detailed block diagram of the digital generator constituting a part of the central switching unit.

Reference should now be made to FIG. 12, illustrating the block diagram of the PCM signal digital generator 131, constituting a part of the central switching unit 11. Said circuit has the purpose of sending, on the PCM channel 17, samples of generic periodic analog signals stored therein. Said samples are sent as already illustrated in FIG. 5a, in frames of 125 μsec. composed of 256 bits, each frame comprising 32 time slots, each of eight bits. In particular each periodic analog signal is formed by an own set of PCM samples resident within the generator 131 and precisely in the sample memory 140. The samples of each signal comprising each eight bits are thus sent in succession in different successive frames, associated with a specific time slot.

Basically, the digital generator 131 comprises the sample memory 140, storing the digital analog signals (for example telephone tones) which the unit 11 must send on the PCM channel 17, a sample memory addresser 141 which controls the repetitive extraction of the samples belonging to different signals in the different time slots and of the samples related to the same periodic analog signal in the same time slot of subsequent frames, a parallel/serial converter 142, which receives the samples in parallel format from the memory 140 and transforms them in serial format for transmission on the PCM channel 17, as well as a process controller, here advantageously constituted by the central processor 120 of the central switching unit 11.

In detail, the sample memory addresser 141 comprises a local oscillator 143 at 8192 KHz, driving a phase generator 144 and having the function of synchronizing and controlling the repetitive dynamics of the entire network. The phase generator is thus connected to the converter 142 on the inputs thereof indicated at CK and LD, to a time slot counter 145, which is periodically incremented upon the arrival, on the input INC, of a pulse supplied by the phase generator 144, and to a current address memory 146, which at each time slot, by means of suitable signals on the inputs RD and WR, is enabled respectively for reading and writing. In turn the current address memory 146 is connected at the output to the sample memory 140 and to a successive address memory 147 at the IND inputs thereof. The output of the successive address memory 147 is thus connected to a multiplexer 148 having another input connected to a tone address register 149, a selection input SEL connected to a time slot comparator 150 and an output connected to the current address memory 146 to selectively supply the memory 146 with the address supplied by the successive address memory 147 or by the tone address memory 149 according to the signal present on the input SEL. In turn, the tone address register 149 is driven at the input by the processor 120 which also controls a time slot address register 151 the output whereof is connected to the time slot comparator 150, furthermore enabled by the processor 120.

The operation of the digital generator 131 is as follows. At the beginning of each time slot the phase generator 144 supplies a pulse to the counter 145 the output value whereof (cyclically varying from 1 to 32) indicates which time slot of the frame is currently processed. The same output of the counter 145 constitutes the address of the current address memory 146 location containing the address of the sample memory 140 location storing the sample to be transmitted in the current time slot, the latter address corresponding to the address of the successive address memory 147 location which contains the address of the sample successive to the one addressed in the current time slot. Accordingly, at the beginning of an each time slot, the current address memory, set in read state by the signal supplied at the input RD by the phase generator, immediately feeds the memories 140 and 147 with the address stored in its location currently addressed by counter 145. The PCM sample to be transmitted is thus taken from the sample memory 140, is loaded in the counter 142 and sent on the PCM channel 17 in synchronism with the signals supplied by the phase generator 144 at the inputs CK and LD of said converter. Simultaneously the successive address memory 147 supplies the address of the current address memory location containing the address of the successive sample, to be sent in the successive frame at the same time slot. Said address is then supplied to the multiplexer 148 which in this phase is set so as to allow its transit towards the current address memory which stores it in the location associated with the current time slot under control of the phase generator through of the input WR. This new address thus corresponds to the sample which will become current in the same time slot of the successive frame.

At the expiration of the time dedicated to the time slot, the phase generator 144 emits a new pulse for the increment of the time slot counter 145, thus causing cyclic repetition of the same procedure for the successive time slots.

The correspondence between the analog periodic signal and the time slot is however not rigid: the control processor 120 can, in fact, activate or deactivate the repetitive emission of the samples of a signal by acting on the sample memory addresser, in particular on the blocks 149-151. In detail, start of the transmission of the PCM samples of a signal in a particular time slot is performed by the processor 120 which introduces, in the tone address register 149, the address of the sample memory 140 location storing the first sample of the signal to be sent and, in the time slot address register 151, the number of the time slot to be associated to the signal. The processor 120 thus enables the time slot comparator 150 which compares the output value of the time slot counter with the value stored in the time slot address register 151. When the two values become equal, that is to say when the specified time slot is to be processed, the time slot comparator 150 sends a suitable signal on the input SEL of the multiplexer 148, thus causing the content of the tone address memory 149 to be sent to the current address memory 146 and to be stored in said memory at the location associated with the desired time slot. At the end of said storing, in the instant in which the time slot counter 145 changes state, the time slot comparator disables automatically so that in the successive frame the content of the tone address register 149 is not rewritten into the current address memory. By means of this procedure, the processor 120 is thus capable of disabling the repetitive emission of the successive samples of a signal, inhibiting the storage of the address supplied at that instant by the successive address memory 147 and starting a different signal in the same time slot or setting the time slot to the idle state by means of the transmission of a null signal. For this purpose the sample memory also stores a single sample corresponding to a null signal which is repeatedly sent on the PCM line at the time slot in idle state.

In practice, in the sample memory 140 (which conveniently can be constituted by a ROM or by a previously loaded RAM) a number of samples corresponding to a whatever plurality of analog periodic signals can be present and the digital generator 131 can selectively activate any set formed by 32 (equal or different) signals in the same frame. Naturally the number of the different types of analog signals is limited only by the capacity of the sample memory, which thus will vary according to the requirements, exactly as occurs for the successive address memory 147, identical to the sample memory 140 since each sample must address a successive sample. On the contrary the current address memory has a size equal to 32 locations, one for each time slot.

Figure 13:
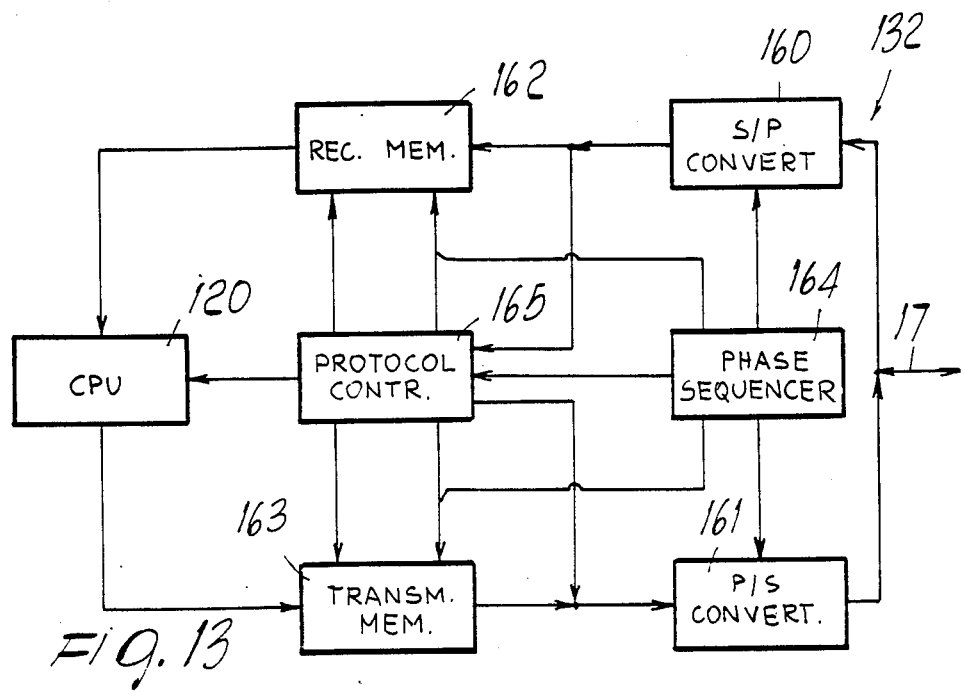
FIG. 13 is a simplified block diagram of the digital interface constituting a part of the central switching unit.
Figure 11:
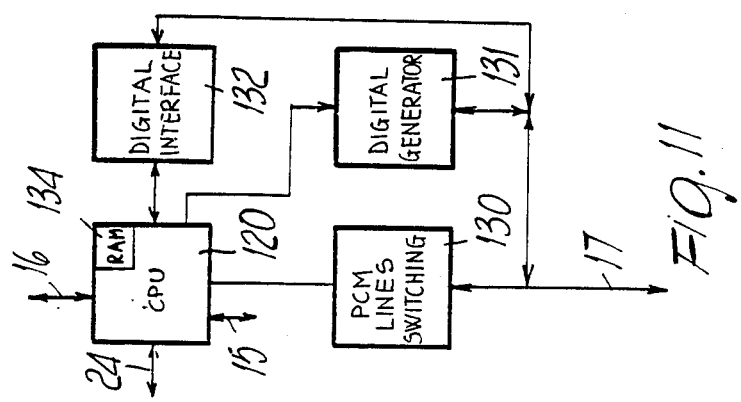
FIG. 11 is a simplified block diagram of the central switching unit.

Reference should now be made to FIG. 13, illustrating the general block diagrm of the digital interface for PCM data, identified by the reference numeral 132 in FIG. 11 and having the purpose of allowing bidirectional exchange of data between the processing unit 10 and a PCM channel 17, having the previously indicated characteristics. For this exchange, the frames and time slots of the PCM channel are organized in a periodic structure of eight frames termed superframe and illustrated in FIG. 5e. Within a superframe the homologous time slots belonging to different frames are considered as separate entities, identified hereinafter as frame slots and indicated in the figure at FS1 FA2, ... FS256. In a superframe, 256 frame slots for each direction of transmission are therefore available, by means of which the interface 132 can simultaneously setup 256 communications at a consequent rate of 8 Kbit/sec. Each communication between the peripheral units 12, 13, 22, 23 and the digital interface 132 for connection to the central processing unit 10 occurs by dividing the data to be transmitted into different records, and the digital interface is capable of automatically handling the simultaneous reception and transmission in all the frame slots. Each record is constituted by a maximum total of 32 bytes, the first one whereof is a start byte, having for example all bits set to zero, the second is a counter byte, of value comprised between 1 and 30 and representing the number of data bytes constituting the record, and the remaining ones are the data bytes, equal in number to the value of the counter byte.

As can be seen from FIG. 13, the digital interface 132 generally comprises a serial/parallel converter 160 connected at the input to the PCM line 17, a parallel/serial converter 161, connected at the output to the PCM line 17, a reception memory 162, connected at the input to the converter 160, a transmission memory 163 connected at the output to the converter 161, a phase sequencer circuit 164 and a protocol controller 165, connected to one another, to the converters 160, 161 and to the memories 162, 163 to correctly process the data related to the frame slots, as well as a control processor, which here too can conveniently be implemented by the processor 120 of the central switching unit 11.

In particular, the reception memory and the transmission memory are each divided into 256 buffers, each associated with a frame slot. At the beginning of a frame slot, the phase sequencer causes the byte present in the serial/parallel converter 160 (received in the preceeding frame) to be sent to the reception memory 162 and to the protocol controller 165 and the byte present in the buffer of the transmission memory (to be transmitted in the just-begun frame slot) to be sent to the parallel/serial converter 161. During the frame slot, while the two converters respectively load and unload the bits associated with the current frame slot, the phase sequencer 164, taking into account the number of the frame slot being transmitted, addresses the reception memory 162 and the transmission memory 163 to allow the protocol controller to process the byte received in the preceeding frame slot and the byte to be transmitted in the successive frame slot. Normally, when no significant transmission is associated with a frame slot, the byte received or transmitted by the digital interface is the idle byte, for example with all the bits set to 1.

In reception, starting from an idle condition, the protocol controller 165 checks the type of byte received. If it corresponds to the idle configuration, it ignores said byte, if instead it detects the configuration indicative of the start byte, it presets itself to allow reception of all the bytes of the homologous frame slots in the successive superframes for a number of superframes depending on the byte number contained in the record to be received, as specified in the successive counter byte. The protocol controller 165 furthermore causes storing of the received bytes in the buffer of the reception memory 162 associated with the frame slot being processed, as identified by the phase sequencer, while the location within the buffer is identified by said protocol controller. When the last byte of the record is received, and thus the transmission ends, the protocol controller 165 informs the control processor 120 that a block of receiving memory 162 has been filled with a record, so that the processor 120 can fetch it and process it.

In transmission, the startup of a communication on the frame slot is given by the control processor 120 which fills the buffer of the transmission memory 163 with the record to be transmitted and inserts the counter byte in the first location. In the absence of communication an idle configuration will instead be present in the buffer. Thus, starting from an idle state, the protocol controller 165 checks the type of byte contained in the first location of the memory buffer associated with the frame slot being processed in that instant. If said byte corresponds to the idle configuration, the controller ignores it, if instead it recognizes the counter byte it sends the start byte, presetting itself for the transmission of the counter byte and of a number of data equal to the value of said counter byte in the homologous frame slots of the successive superframes. The protocol controller 165 thus extracts the bytes to be transmitted from the buffer of the transmission memory 163 associated with the frame slot being processed, as identified by the phase sequencer 164, while the location within the buffer is identified by said protocol controller 165. At the end of the transmission of the record, the protocol controller 165 restores the idle byte configuration in the first location of the buffer of the transmission memory 163 associated with the frame slot being processed at that instant.

Figure 14:
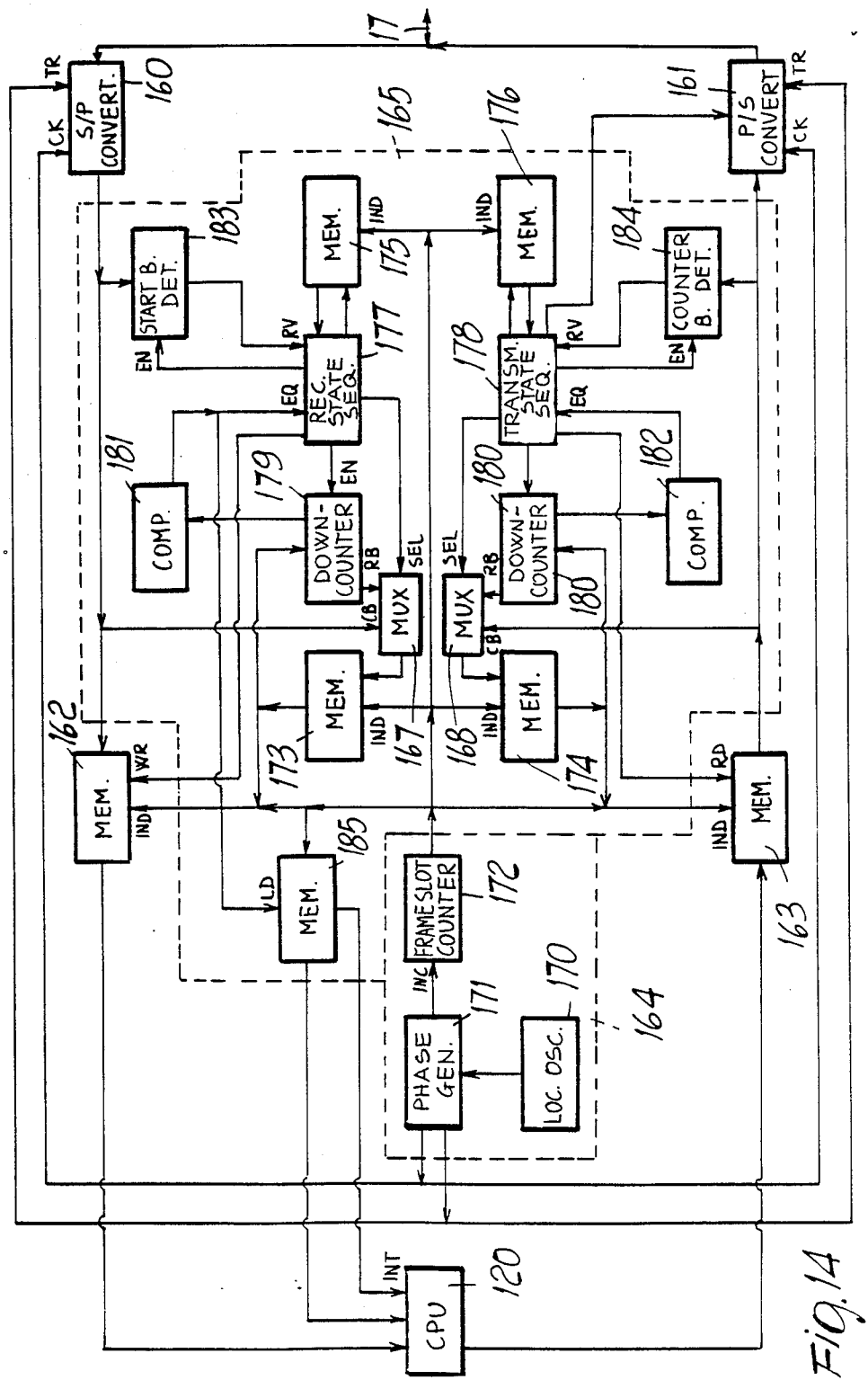
FIG. 14 is a detailed block diagram of the digital interface according to FIG. 13.

FIG. 14 illustrates the detailed block diagram of the digigal interface 132. As can be seen, the phase sequencer 164 comprises a local oscillator 170 at 8192 KHz driving a phase generator 171 connected on one side to the serial/parallel and parallel/serial converters 160, 161 and on the other side to a frame slot counter 172 which on its input INC receives the count pulses from said phase generator so that its output has a value corresponding to the frame slot being processed at that instant. The protocol controller 165 in turn comprises a plurality of memories, and precisely the reception current address memory 173, the transmission current address memory 174, the reception state memory 175 and the transmission state memory 176, each having 256 locations, each associated with a frame slot, correspondingly to the buffers of the reception and transmission memories 162 and 163; then the memories 173–176 are addressed at the respective inputs IND, for specifying which of the 256 locations contains the data related to the frame slot being processed at that instant. The current address memories 173, 174 store the number of data bytes of a record still to be received, which number also represents the address of the current location in the reception or transmission buffer, while the state memories 175, 176 feed the reception 177 and transmission 178 state sequencer circuits with configurations indicative of the state of the frame slot being processed (that is to say, if it is in idle state, awaiting a counter byte or in data reception or transmission state). The controller 165 furthermore comprises two down-counters 179 and 180, enabled on the input EN respectively by the sequencer 177 and by the sequencer 178 and connected, by means of multiplexers 167, 168, respectively to the reception current address memory 173 and to the transmission current address memory 174 so as to generate the addresses of the successive locations within the buffers of the memories 162 and 163, when so enabled by the sequencers 177 and 178. These addresses are then sent to the inputs CB of the multiplexers 167, 168, each having a second input RB connected respectively to the output of the serial/parallel converter 160 and to the output of the transmission memory 163, and a selection input SEL, connected to an output of the sequencer 177 or 178 to select which of the two inputs must be sent at the output towards the current address memory 173 or 174. The controller 165 also comprises two zero comparators 181 and 182, respectively for reception and for transmission, for detecting the end of reception or of transmission of the record, as well as a start byte detector circuit 183 connected to the output of the converter 160, to identify the start of the reception and a counter byte detection circuit 184 connected to the transmission memory 163 to identify the start of the transmission of a record. A buffer memory 185 is furthermore provided in the controller 165 and is connected to the comparator 181 and to the processor 120 to store the number of the frame slot associated with the reception buffer containing an entire record and supply it to the processor 120.

The operation of the circuit of FIG. 14 is as follows. In reception, at the beginning of a frame slot, the phase generator 171 causes the serial/parallel converter 160 to transfer the byte received in the preceeding frame slot from the shift register to the output register of the same converter 160. In this manner the shift register of the converter remains free for the reception of the bits associated with the current frame slot, bits which are samples by means of a signal arriving from the phase generator on the input CK, while the protocol controller processes the byte received in the preceeding frame slot. Assume the preceeding frame slot, currently being processed, was in idle condition, with the reception state memory 175 storing, in the position associated with said frame slot, the idle configuration. In this condition the reception state sequencer 177 keeps the start byte detector 183 enabled, which thus continuously checks the received byte to detect the reception of the start byte, indicative of the beginning of a data transmission. The reception part thus keeps in this state until the detector 183 detects a start byte.

When the detector recognizes said start byte, indicating the beginning of the reception of a record, it notifies this event to the sequencer 177 on the RV input thereof which thus stores a configuration indicating the counter byte reception wait state in the reception state memory 175, at the location associated with the processed frame slot.

In the successive homologous frame slot, upon the reception of the counter byte, the reception state sequencer 177, fetching the current state from the reception state memory 175, disables the start byte detector 183 and enables the storage of the counter byte in the current address memory 173 (controlling the multiplexer 167 on the input SEL so that the same supplies to the memory 173 the datum present on its input CB) and in the memory 162 (acting on the input WR thereof) in the buffer indicated by the counter 172 and in the locatin of the buffer currently addressed by the current reception address memory 173, having zero value. Once the storage has occurred, said zero position will indeed contain the value of the counter byte, so that at the successive homologous frame slot the current memory 173 addresses a new location within the buffer, equal in value to the counter byte and intended to accommodate the first received data byte. In the meantime the sequencer has loaded the reception state memory 175 with a configuration corresponding to the data byte reception wait state.

The successive bytes of the record are then stored consecutively in the reception buffer in locations having progressively decreasing values, while the configuration stored in the reception state memory 175 remains unchanged. In the meantime, the down-counter always updates the buffer location addressed by the current address memory 173 and stores it again therein through the multiplexer 167, now controlled by the state sequencer 177 so as to output the datum present on its input RB. Every time the down-counter furthermore sends the value corresponding to said updated location also to the comparator 181 which thus compares said value with zero. When thus the comparator detects that the value supplied by the down-counter 179 has become equal to zero, that is to say when the last byte of the record is received, it informs the phase sequencer 177, on its input EQ, that the reception phase is to be ended. Accordingly the sequencer stores in the memory 175 the configuration corresponding to the idle state. Simultaneously the comparator informs the buffer memory 185, on its input LD, that the frame slot addressed by the frame slot counter 172 is associated with a reception buffer containing a complete received record, thus enabling the storage, in said buffer memory, of said frame slot number so that then the control processor 120, informed by the buffer memory on the input INT, can fetch it and process it.

In transmission, at the beginning of a frame slot, the phase generator 171 instructs the parallel/serial converter 161, on the input TR, to transfer the byte processed in the preceeding frame slot from the input register to the shift register of said converter. In this manner the shift register can transmit on line 17 the bits corresponding to the previous frame slot, being synchronized by a signal arriving from the phase generator 171 and supplied on the input CK.

Assume one is in idle state. In these conditions the transmission state memory 176 stores the corresponding configuration and the transmission state sequencer 178 keeps the counter byte detector 184 enabled to check the byte present in the first location (identified as location "zero") of the transmission buffer associated with the frame slot being processed at that instant. Until the buffer stores the idle configuration, the state of the network remains unchanged.

When the byte in the first location of the buffer assumes a value different from the idle one, that is to say it represents the counter byte of the record to be transmitted, the counter byte detector notifies the event to the state sequencer 178, on the input RV of the latter, which thus sends the start byte towards the converter 161 and stores a configuration corresponding to the counter byte transmission state in the transmission state memory 176.

In the successive homologous frame slot the transmission memory 163, addressed by the current address memory 174 (in turn storing the address supplied by the multiplexer 168 and corresponding to location zero), sends the first stored byte, coinciding with the counter byte, towards the converter 161, while the transmission state sequencer 178 reads the state of the memory 176, disables the counter byte detector 184 and, by means of the selection input SEL of the multiplexer 168, enables the latter to send at the output the datum present on its input CB, thus causing the storage of the counter byte in the current address memory 174 at the location associated with the frame slot being processed at that instant. In this manner, at the subsequent transmission, the current address memory 174 determines the location within the buffer in which the first byte to be transmitted is stored, said locatin having an address equal to the length of the complete record to be transmitted. Simultaneously the sequencer feeds the transmission state memory 176 with the configuration corresponding to the data byte transmission status.

Subsequently, at the successive homologous frame slot, the first data byte of the record to be transmitted is taken, within the buffer associated with that frame slot, from the location addressed by the current address memory 174 and is sent to the converter 161, while the configuration of the successive state remains unchanged. As for the reception section, the address stored by the current address memory 174 is simultaneously sent to the down-counter 180 which updates it and again supplies it, through the multiplexer 168 (now controlled by the signal supplied by the sequencer 178 on the input SEL so as to send the signal present on the input CB towards the output), to the current address memory 174 which thus addresses, within the buffer, the address location equal to the counter byte decremented by one and storing the second data byte. The output of the down-counter is simultaneously supplied also to the comparator 182 which thus compares the down-counter output (therefore corresponding to the successive address) with the zero value to identify transmission end.

The various data bytes constituting the record are similarly transmitted one after the other.

When the last data byte is transmitted, the comparator 182 detects that the value of the output of the down-counter 180 has become equal to zero and therefore causes the transmission state sequencer 178 to terminate the transmission phase, storing the configuration corresponding to the idle state in the transmission state memory 176. Then the system sets in a further transmission waiting state, returning to the beginning of the cycle.

Naturally the described cycle occurs in an exactly equal manner for all the frame slots of the transmission period, even if the different frame slots are handled independently from one another.

The invention thus conceived is susceptible to numerous modifications and variations, all of which are within the scope of the inventive concept.

Furthermore, all the details may be replaced with other technically equivalent ones.

We claim:

1. A system for automatic control of devices, apparatus and peripheral units for signal switching and processing as phone, data and image digitized signals, comprising a single central control unit for controlling a plurality of terminals including telephone sets and/or peripherals and/or other numerically controllable actuator devices, said plurality of terminals being connected to said central control unit through two-wire internal digital lines, said internal digital lines defining each a time sharing transmission channel, divided into a plurality of time slots, each said terminal being fixedly associated to at least one preset time slot, wherein said internal digital lines are connected to a plurality of terminal interfaces, each connected to a respective terminal, for receiving signals sent on said internal digital lines toward said respective terminal and transmitting on said internal digital lines signals arriving from said respective terminal in preset time intervals, each said terminal interface comprising a local oscillator driving a phase lock circuit and a time slot/frame selection circuit, said selection circuit being furthermore controlled by said phase lock circuit and by a control processor, a transmission and reception section being furthermore connected to said internal digital lines and to the respective terminal and being driven by said selection circuit and by said control processor for data and signaling exchange.

2. A system according to claim 1, wherein said transmission and reception section of each said terminal interface comprises an input buffer connected to said internal line, an output buffer connected to said internal line, transmission registers connected to the respective terminal and to said control processor and to said output buffer, reception registers connected to said input buffer and to the respective terminal and said control processor, as well as a start bit generator connected to said output buffer.

3. A system according to claim 1, wherein said phase lock circuit of said terminal interface comprises a start bit search circuit, and a synchronization search circuit connected to said transmission and reception section.

4. A system according to claim 1, wherein said phase lock circuit comprises a start bit search circuit and a synchronization search circuit, and said selection circuit of said terminal interface comprises a sampling pulse generator enabled by said start bit search circuit, counters controlled by said start bit search and synchronization search circuits for synchronizing said selection circuit with the signals received from said internal line, selection registers controlled by said control processor for identifying preset time intervals associated with the respective terminal, as well as comparators connected to said counters and said selection registers for generating enabling signals for said transmission and reception section.

5. A system according to claim 4, wherein said synchronization search circuit comprises a superframe synchronization search circuit and a frame synchronization search circuit, and said counters comprise a frame counter, reset by said superframe synchronization search circuit and incremented by said frame synchronization search circuit, a time slot counter, reset by said superframe and frame synchronization search circuits and incremented by said start bit search circuit, as well as a bit counter, reset by said start bit search circuit and incremented by said sampling pulse generator.

6. A system according to claim 4, wherein said counters comprise a frame counter, a time slot counter and a bit counter, and said comparators comprise a frame comparator connected to said frame counter and said selection register, a time slot comparator, connected to said time slot counter and said selection registers and enabled by said frame comparator and a bit comparator connected to said bit counter, enabled by said time slot comparator and synchronized by said sampling pulse generator for generating sequential enabling pulses for said transmission and reception sections.

7. A system for automatic control of devices, apparatus and peripheral units for signal switching and processing as phone, data and image digitalized signals, comprising a single central control unit for controlling a plurality of terminals including telephone sets and/or peripherals and/or other numerically controllable actuator devices, said plurality of terminals being connected to said central control unit through two-wire internal digital lines defining each a time sharing transmission channel, divided into a plurality of time slots, each said terminal being fixedly associated to at least one preset time slot, said central control unit comprising an internal line unit driving said internal digital lines for controlling transmission of signals to and from said plurality of terminals and an external line unit for connection with at least one external line and adaptation of signals arriving from said external line into signals processable by the system.

8. A system according to claim 7, further comprising line regenerator circuits connected to said internal digital lines for regenerating signals transmitted on said internal digital lines arriving from said internal line unit and from said terminals and for delaying the signals transmitted towards said internal line unit.

9. A system according to claim 8, wherein said regenerator circuits comprise a terminal interface for synchronizing and selecting the signals to be regenerated, an input/output section, connected to said terminal interface and an internal line portion for regenerating said selected signals and further signals received by said line portion, as well as a delay circuit for delaying said further signals received from said line portion.

10. A system according to claim 9, wherein said delay circuit comprises a start bit search circuit, connected to said input/output section, a sampling pulse generator enabled by said start bit search circuit, a reception register, connected to said input/output section and to said sampling pulse generator for storing said further signals received from said line portion, as well as a shift register, connected to said reception register and to terminal interface for sending towards said terminal interface said further signals in delayed time intervals.

11. A process for exchanging phone, data and image digitized signals between a PCM line and a plurality of terminals, connected to at least one digital internal line, comprising: sending said signals on said internal digital line with time sharing coding by transmission of a plurality of superframe bits in a time period, wherein said transmission of a plurality of superframe bits comprises transmission of a plurality of groups of frame bits, the transmission of each group of frame bits comprises transmission of a group of initial synchronization bits followed by transmission of a plurality of groups of time slot bits, said group of initial synchronization bits comprising a plurality of bits arranged in two predetermined configurations comprising an initial superframe configuration for a first group of frame bits in said plurality of superframe bits and a second configuration for successive frame bit groups in said plurality of superframe bits, the transmission of each group of time slot bits comprises transmission of at least one initial bit, transmission of a plurality of data bits, transmission of at least one signaling bit, reception of at least one further initial bit, reception of at least a further plurality of data bits and reception of at least one further signaling bit.

12. A process according to claim 11, wherein the transmission of said at least one initial bit enables a single terminal to receive the plurality of data bits and the at least one signaling bit and to transmit said at least one further initial bit, said plurality of further data bits and said at least one further signaling bit, depending on the position of said group of time slot bits in said plurality of time slot bit groups and of said frame bit group in said plurality of superframe bits.

13. A process according to claim 11, wherein said transmission of a plurality of groups of frame bits comprises transmission of 2048 bits divided into eight groups of frame bits each of 256 bits, said transmission of said group of synchronization bits comprises transmission of 16 bits, said transmission of each group of time slot bits comprises transmission of 30 bits, said transmission of a plurality of data bits comprises transmission of eight bits, said reception of a further plurality of data bits comprises reception of eight bits and said transmission of each group of time slots bits further comprises ten empty time intervals without transmission nor reception for compensating line delays.

14. A system for automatic control of devices, apparatus and peripheral units for signal switching and processing as phone, data and image digitized signals, comprising a single central control unit for controlling a plurality of terminals including telephone sets and/or peripherals and/or other numerically controllable actuator devices, said plurality of terminals being connected to said central control unit through two-wire internal digital lines defining each a time sharing transmission channel, divided into a plurality of time slots, each said terminal being fixedly associated to at least one preset slot, said central control unit including a central processing unit for centralized data and system processing, a central switching unit for phone and/or data and/or image digitized signals routing among the units of said central control unit, an internal line unit driving said internal digital lines for controlling transmission of signals to and from said plurality of terminals, an external line unit for connection with at least one external line and adaptation of signals arriving from said external line into signals processable by the system, a memory unit for storing control data and programs, and a system bus interposed between said central processing unit, central switching unit, internal line unit, external line unit and memory unit for allowing exchange of said digitized signals and control information among said units.

15. A system according to claim 14, wherein said system bus comprises three communication buses including a first high-speed bus connecting said central processing unit to said central switching unit for fast data exchange and for sending initialization data from said central processing unit towards said internal and external line units; a second slower bus connecting said central switching unit, said internal line unit and said external line unit for exchanging operative signalings; and a PCM bus for allowing exchange of phone, data and image digitized signals among the units of said central control unit and said plurality of terminals.

16. A system according to claim 15, wherein said central control unit further comprises a mass storage controller, a speech synthesis/analysis unit and at least one junction line interface for controlling connection with further systems, and said internal and external line units, said mass storage controller, said speech synthesis/analysis unit and said junction line interface are modular units, connectable in a variable number.

17. A system according to claim 15, wherein said central control unit further comprises a mass storage controller and two connection lines connecting said central processing unit with said central switching unit and said mass storage controller for sending interrupt signals.

18. A system according to claim 15, wherein said central control unit further comprises a mass storage controller and a junction line interface, said central switching unit, said mass storage controller, said junction line interface and said internal and external line units being intelligent elements, having each an own control processor.

19. A system according to claim 15, wherein said internal line unit comprises a peripheral processor for processing signaling data in transit through said internal line unit, towards and from said terminals, and for performing internal telephone services and an internal interface drive unit connected to said peripheral processor for grouping phonic, numeric, visual data arriving from said central switching unit on said PCM bus and routing towards said terminals on a plurality of internal PCM lines, said peripheral processor comprising an internal data and program memory and interface means for connection to said first high-speed and said second slower buses.

20. A system according to claim 19, further comprising at least one internal line drive unit including at least one internal line interface connected to said terminals through a digital internal line, to said internal interface drive unit through one of said internal PCM lines and to said peripheral processor of said internal line unit through a signaling line, a central oscillator and a phase counter being connected to said at least one internal line interface for synchronization.

21. A system according to claim 20, wherein said internal line drive unit comprises a plurality of said internal line interfaces, each connected to one said digital internal line, said internal line interfaces being connected in parallel to one another, to said one internal PCM line and to said peripheral processor and being selectively and consecutively enabled by said general phase counter and said central oscillator to receive from said internal interface drive unit only data and signalings sent at preset times and to transmit data and signalings arriving from said terminals onto said one internal PCM line and onto said signaling line only at preset times.

22. A system according to claim 21, wherein each said internal line interface has a transmission section for processing signals to be sent on said digital internal line and a reception section for exactly capturing data and signalings sent by said terminals on said digital internal line and to transmit them onto said one internal PCM line.

23. A system according to claim 21, wherein each said internal line interface has a transmission section including an interface phase counter, connected to said central oscillator and said general phase counter, a synchronization generator enabled by said interface phase counter and for generating sequences of bits for frame and superframe synchronization, a start bit generator, enabled by said interface phase counter, transmission registers connected to said internal PCM line and to said peripheral processor and synchronized by said interface phase counter for storing only data to be sent onto a respective digital internal line and present on said internal PCM line at a said preset time intervals and for storing signalings to be sent on said respective digital internal line, as well as an output buffer connected to said synchronization generator, to said start bit generator and to said transmission registers and enabled by said interface phase counter for consecutively transmitting frame and superframe synchronization bits, a start bit and said data and signalings.

24. A system according to claim 23, wherein each said internal line interface has further a reception section including an input buffer, connected to said respective digital internal line, a start bit search circuit, enabled by said central oscillator and said interface phase counter and connected to said input buffer, a sampling pulse generator enabled by said start bit search circuit, reception registers, connected to said input buffer and synchronized by said interface phase counter and sampling pulse generator for storing signals present on said respective internal line, for data transmission in predetermined time intervals onto said internal PCM line and for signaling transmission towards said peripheral processor.

25. A system according to claim 15, wherein said central switching unit comprises a digital generator of periodic signals formed by a plurality of signal samples to be transmitted on said PCM bus, said digital generator including a sample memory having a plurality of memory locations storing said signal samples to be transmitted, a sample memory addresser, connected to said sample memory for addressing the memory location of said sample memory containing the sample to be transmitted, and a control processor connected to said addresser for varying transmission sequences of said signal samples and associating them with selectable time slots.

26. A system according to claim 25, wherein said sample memory contains said samples in parallel form and said digital generator furthermore comprises a parallel/serial converter, connected to said sample memory and receiving therefrom said signal samples in parallel form and sending said samples serially on said PCM bus.

27. A system according to claim 25, wherein said sample memory addresser comprises a timing phase generator, a time slot counter, connected to said phase generator and generating a signal indicative of a current time slot; a successive address memory, having memory locations univocally connected to said memory locations of said sample memory and storing an address of a successive signal sample for each signal sample stored in said memory locations of said sample memory; a current address memory having a first address input (IND), a second data input and an output, said first address input being connected to said time slot counter and said output being connected to said sample memory and to said successive address memory; a tone address register connected to said control processor and receiving therefrom the address of a first sample of a periodic signal to be sent; a time slot address register connected to said control processor and receiving therefrom a signal corresponding to the time slot to be associated to said periodic signal to be sent; a time slot comparator, connected to said time slot address register and said time slot counter, for generating a selection signal when the time slot specified by said time slot counter corresponds to the time slot specified by said time slot address register; as well as a multiplexer, having a first input connected to said successive address memory, a second input connected to said tone address register and an output connected to said data input of said current address memory, said multiplexer being controlled by said selection signal so as to selectively connect its output with one of said first and second multiplexer inputs, and said current address memory being controlled by said time slot converter and said phase generator to address the memory location of said sample memory storing a current signal sample and to address the memory location of said successive address memory storing the successive signal and, then, to store a successive signal sample address as fed by said multiplexer.

28. A system according to claim 15, wherein said central switching unit comprises a digital interface for data exchange between said central processing unit and said PCM bus, said interface including a serial/parallel converter connected to said PCM bus, a reception memory, connected to said serial/parallel converter and receiving therefrom groups of data to be stored, a control processor connected to said reception memory and receiving therefrom data records formed by a plurality of said data groups, a transmission memory, connected to said control processor and receiving therefrom data records, a parallel/serial converter, connected to said transmission memory and to said PCM bus, said reception and transmission memories being divided into a plurality of buffers for storing said data records selectively received and to be transmitted at preset time intervals, said interface furthermore comprising a timing phase sequencer and a protocol controller, both connected to said reception and transmission memories and to said control processor for detecting beginning of reception of a data record, for controlling correct storage of said data groups of a same record in said reception memory, for sending received complete data records towards said control processor and for allowing transmission of a data record from said transmission memory in said data groups onto said PCM bus at preset time intervals.

29. A system according to the claim 28, wherein each said data record comprises a first data group having a preset configuration indicative of record start, a second data group indicative of the length of said record and at least one further data group, and said protocol controller comprises a reception stage including a record start detector, connected to said serial/parallel converter for detecting said first data group and generating a record start signal, a reception state memory for storing a state configuration selectively corresponding to a record start waiting state, a second data group waiting state and a data reception state, a reception state sequencer, connected to said record start detector and to said reception state memory for enabling said record start detector at the end of a data record reception and for selectively feeding said reception state memory with one of said state configuration for each time interval, a reception current address memory, connected to said serial/parallel converter and addressing said reception memory for grouping the data groups of a same record received at different time intervals, a down-counter enabled by said reception state sequencer and connected to said reception current address memory for receiving memory addresses and generating updated memory addresses for storage of successive data groups, a comparator, connected to said state sequencer for comparing the updated memory addresses generated by said down-counter to a zero value and generating a reception end signal, as well as a buffer memory, connected to said comparator for storing the address of a memory location of said reception memory storing an entire record and sending a complete record signal to said control processor.

30. A system according to the claim 29, wherein said reception stage of said protocol controller comprises a multiplexer having a first input connected to said serial/parallel converter, a second input connected to said down-counter, a selection input, connected to said reception state sequencer and an output connected to said reception current address memory.

31. A system according to claim 28, wherein each said data record comprises a first data group having a preset configuration indicative of record start, a second data group indicative of the length of said data record and at least one further data group, wherein said protocol controller comprises a transmission stage including a transmission state memory for storing a state configuration selectively corresponding to a record start waiting state, a second data group transmission and a data transmission state at each time interval, a transmission state sequencer connected to said transmission state memory for receiving therefrom and updating the stored state configuration for each time interval, a transmission start detector, connected to said transmission memory for detecting said second data group and generating a record start signal sent to said transmission state sequencer, a transmission current address memory, addressing said transmission memory for allowing transmission in sequence of said data records at different time intervals, a down-counter enabled by said transmission state sequencer and connected to said transmission current address memory for receiving memory addresses and generating updated memory addresses fed to said current address memory, a comparator, enabled by said transmission state sequencer and connected to said down-counter for comparing with zero said updated memory addresses and generating a transmission end signal when said updated memory addresses are equal to zero.

32. A system according to claim 31, wherein said transmission stage furthermore comprises a multiplexer having a first input connected to the output of said transmission memory, a second input connected to said transmission down-counter, a selection input connected to said transmission state sequencer and an output connected to said transmission current address memory.

33. A system according to claim 15, comprising at least one junction digital line extending from said central control unit for high-speed connection to further automatic control systems, said central control unit furthermore comprising a mass storage controller, a speech synthesis/analysis unit for sending and recording speech signals, at least one junction line interface for controlling connection with further systems along said junction digital line, said mass storage controller, said speech synthesis/analysis unit and said junction line interface being connected to said system bus.

* * * * *